US012810621B2

(12) United States Patent
Penrose et al.

(10) Patent No.: US 12,810,621 B2
(45) Date of Patent: Nov. 24, 2026

(54) PATH CLASSIFICATION FOR DETECTION

(71) Applicant: International Business Machines Corporation, Armonk, NY (US)

(72) Inventors: Andrew Thomas Penrose, Castleknock (IE); Jonathan David Dunne, Dungarvan (IE); Steven Wayne Tomasi, Derry, NH (US); Katherine L. Collins, Haverhill, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/008,943

(22) Filed: Jan. 3, 2025

(65) Prior Publication Data

US 2026/0100048 A1 Apr. 9, 2026

(30) Foreign Application Priority Data

Oct. 9, 2024 (GB) ..................................... 2414841

(51) Int. Cl.
*G06V 20/54* (2022.01)
*G06T 5/50* (2006.01)
(Continued)

(52) U.S. Cl.
CPC ................ *G06V 20/54* (2022.01); *G06T 5/50* (2013.01); *G06V 10/761* (2022.01); (Continued)

(58) Field of Classification Search
None
See application file for complete search history.

(56) References Cited

U.S. PATENT DOCUMENTS 8,504,223 B2 8/2013 Boorman et al.
9,098,996 B2 8/2015 Barraci et al.
(Continued)

FOREIGN PATENT DOCUMENTS

CN 112329815 A 2/2021
CN 116597397 A 8/2023
(Continued)

OTHER PUBLICATIONS

Kumaret al., "Classification and Analysis of Go-Arounds in Commercial Aviation Using ADS-B Data", MDPI, Aerospace 2021, pp. 1-21.
(Continued)

*Primary Examiner* — Eileen M Adams
(74) *Attorney, Agent, or Firm* — Seed Intellectual Property Law Group LLP

(57) ABSTRACT

A method, system, computer program product and computer program for managing vehicle paths is presented. The method includes receiving a historical dataset, the historical dataset including a first set of images of vehicle paths associated with a first location and training an AI model with the first set of images to determine a first model and a set of classifications for the first set of images. The method further includes identifying a first vehicle, creating a first image of a first path taken by the first vehicle; applying the first image to the first model to determine a first classification of the set of classifications for the first path, and based on the first classification, performing an action related to the first vehicle.

18 Claims, 10 Drawing Sheets

(51) Int. Cl.
*G06V 10/74* (2022.01)
*G06V 10/764* (2022.01)

(52) U.S. Cl.
CPC .. *G06V 10/764* (2022.01); *G06T 2207/20221* (2013.01); *G06V 2201/07* (2022.01)

(56) References Cited

U.S. PATENT DOCUMENTS

| | | | | |
|---|---|---|---|---|
| 2004/0054448 A1 | 3/2004 | Ito | | |
| 2023/0159052 A1* | 5/2023 | Yang | B60W 60/001 701/23 | |
| 2023/0319218 A1* | 10/2023 | Ren | G06T 3/4038 382/284 | |
| 2023/0351638 A1* | 11/2023 | Wu | G06T 7/97 | |
| 2025/0005948 A1* | 1/2025 | Potter | G06V 20/52 | |
| 2025/0334413 A1* | 10/2025 | Khanna | G01C 21/36 | |

FOREIGN PATENT DOCUMENTS

| | | | |
|---|---|---|---|
| CN | 117992906 | A | 5/2024 |
| WO | 2006/009127 | A1 | 1/2006 |

OTHER PUBLICATIONS

Subramanian et al., "Deep-learning based Time Series Forecasting of Go-around Incidents in the National Airspace System", American Institute of Aeronautics and Astronautics, 2018, pp. 1-12.
Wang et al., "Airspace Risk Management Using Surveillance Track Data: Stabilized Approaches", Apr. 23, 2015, 36 pages.
Wang et al., "Feasibility of Using Historical Flight Track Data to Nowcast Unstable Approaches", 2016, 7 pages.
Intellectual Property Office, "Patents Act 1977: Search Report under Section 18(3)", Apr. 2, 2025, 04 Pages, GB Application No. 2414841.3.

* cited by examiner

PATH CLASSIFICATION FOR DETECTION

BACKGROUND

A flight dispatcher (also known as an airline dispatcher or flight operations officer) assists in planning flight paths, considering aircraft performance and loading, enroute winds, thunderstorm and turbulence forecasts, airspace restrictions, and airport conditions. Dispatchers also provide a flight following service and advise pilots if conditions change. In the United States and Canada, the flight dispatcher shares legal responsibility with the commander of the aircraft (joint responsibility dispatch system), so it may be imperative that deviations from scheduled flight schedules may be identified as soon as possible. A dispatcher may be responsible for a number of concurrent flights, so prompt identification of go-arounds may be essential. The problem for dispatchers may be different from air traffic control (ATC), because dispatchers usually work in the operations center of the airline, and not at a destination airport, in contrast with ATC.

A dispatcher during a duty shift, may be assigned a number of flights. One of the problems from our customers may be that as they managing this list of flights there may be no way of knowing or being alerted that go-arounds are occurring unless the dispatcher pro-actively checks that the aircraft has landed or not. It not reported in any of the available data streams and would not be available to the dispatcher until much later if the pilot reports it to the airline or dispatcher. Knowing as early as possible when a go-around has occurred will give them a better situational awareness of what may be happening with the flights they manage.

Operations management solutions exist that provide early insight into changing flight, airport, and airspace conditions. Some incorporate a streamlined workflow so flight dispatchers can make decisions with confidence and improve safety and efficiency of the airline operation. In this way, improvements in efficiency, safety, and reliability of aviation operations can be made.

SUMMARY

One or more embodiments of the present disclosure are generally directed to path classification. In particular the embodiments of the present disclosure provide a method, system, and a computer program product for managing vehicle paths.

In an embodiment of the present disclosure, a computer implemented method for managing vehicle paths may be presented. The method includes receiving a historical dataset, the dataset including a first set of images of vehicle paths. The method includes training an AI model with the first set of images to determine a first model and a set of classifications for each of the images for a first location. The method includes identifying a first vehicle and creating a first image of a first path taken by the first vehicle. The method further includes applying the first image to the model to determine a first classification of the set of classifications for the first image path and based on the first classification, performing an action related to the first vehicle.

In another embodiment of the present disclosure, a computer system may be provided. The computer system includes a processor set, one or more computer-readable storage media, and program instructions stored on the one or more computer-readable storage media to cause the processor set to perform operations. The operations include receiving a historical dataset, the dataset including a first set of images of vehicle paths. The operations include training an AI model with the first set of images to determine a first model and a set of classifications for each of the images for a first location. The operations include identifying a first vehicle, creating a first image of a first path taken by the first vehicle, and applying the first image to the model to determine a first classification of the set of classifications for the first image path. The operations further include, based on the first classification, performing an action related to the first vehicle.

In another embodiment of the present disclosure, a computer program product may be provided. The computer program product includes one or more computer-readable storage media and program instructions stored on the one or more computer-readable storage media to perform operations. The operations include receiving a historical dataset, the dataset including a first set of images of vehicle paths. The operations include training an AI model with the first set of images to determine a first model and a set of classifications for each of the images for a first location. The operations include identifying a first vehicle, creating a first image of a first path taken by the first vehicle, and applying the first image to the model to determine a first classification of the set of classifications for the first image path. The operations further include, based on the first classification, performing an action related to the first vehicle.

In an example, receiving the historical dataset comprises creating the first dataset by gathering data, the data comprising at least one of vehicle position reports, vehicle images, and location data.

In an example, the vehicle comprises one of air transport, ground transport, and sea transport. In an example, the first image may be added to the historical dataset to create a second set of images, and the AI model may be retrained with the second set of images.

In an example, the embodiments further include identifying a second vehicle, creating a second image of a second path taken by the second vehicle, comparing the first image with the second image to determine a composite image, applying the composite image to the model to determine a composite classification of the set of classifications for the composite image, and based on the composite classification, performing an action related to at least one of the first vehicle and the second vehicle.

In an example, the set of classifications includes at least one of a successful path, a go-around path, a runway miss path, a lane veer path, a collision path.

In an example, the AI model comprises a Convolutional Neural Network (CNN); a Generative Adversarial Network (GAN); a Transformer-Based Models; an Autoencoder; an Recurrent Neural Network (RNN), a Large Language Models; or a You Look Once (YOLO) detection algorithm.

In an example, creating a first image of a first path taken by the first vehicle comprises creating timed images for the first vehicle over successive time slices, and collating the timed images to determine the first image.

In an example, applying the first image to the model to determine a first classification comprises determining a closest match of the first image from the dataset.

In an example, determining the closest match comprises matching the first image with partial images of the dataset.

The embodiments may identify aircraft go-arounds by using aircraft position reports, flight data and airport data to first create datasets of flight path images that represent the flight path of an aircraft as it comes towards a landing at an airport along with the underlying details and image of the runways direction and length. In this manner, a collection of historical aircraft approaches can be created in imagery with those representing go-arounds classified as such using for example a CNN. This model can then be created per airport and used to classify whether real-time incoming aircraft are in fact in a go-around scenario or not. Models can be retrained using actual go-around data after the fact and user feedback to train models based on different times of year at the airport in question.

The embodiments may enable a feature that provides additional situational awareness to the dispatcher. For example, when a "go-around" may be detected, a dispatcher knows that there may be still an aircraft that needs tracking and the opportunity to assist still exists.

The embodiments may allow provide for how to use of the created image to detect whether a go-around event has occurred or not. In addition, prediction of whether a go-around will occur can also be made. There may be a period of time coming up towards an airport where data may be gathered to create images. The classifier could predict paths if classification may be in place and training data for "not yet past the runway" image scenarios.

The aircraft location over a period of time, along with the location of runways for the destination International Civil Aviation Organisation (ICAO) may be used to create a synthetic image of the flight path of the aircraft along with overlays. A time period may be calculated based on when the flight path should begin to be drawn and when it should stop being drawn. Using image classification methods, whether a flight has initiated a go-around may be determined.

The embodiments may identify aircraft go-arounds by using aircraft position reports, flight data and airport data to first create datasets of flight path images that represent the flight path of an aircraft as it comes towards a landing at an airport along with the underlying details and image of the runways direction and length. In this manner, a collection of historical aircraft approaches can be created in imagery with those representing go-arounds classified as such using, for example, a CNN. This model can then be created per airport and used to classify whether real-time incoming aircraft are in a go-around scenario or not. Models can be retrained using actual go-around data after the fact and user feedback to train models based on different times of year at the airport in question.

The embodiments may enhance vehicle control for human driven and autonomous vehicles in addition to existing sensors.

The above summary may be not intended to describe each illustrated embodiment or every implementation or example of the present disclosure.

BRIEF DESCRIPTION OF THE DRAWINGS

The drawings included in the disclosure are incorporated into, and form part of, the specification. They illustrate embodiments of the present disclosure and, along with the description, explain the principles of the disclosure. The drawings are only exemplary of certain embodiments and do not limit the disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what may be shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") may be a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" may be any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term may be used in the present disclosure, may be not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data may be typically moved at some occasional points in time during normal operations of a storage device, such as during access, de-fragmentation or garbage collection, but this does not render the storage device as transitory because the data may be not transitory while it may be stored.

Figure 1:
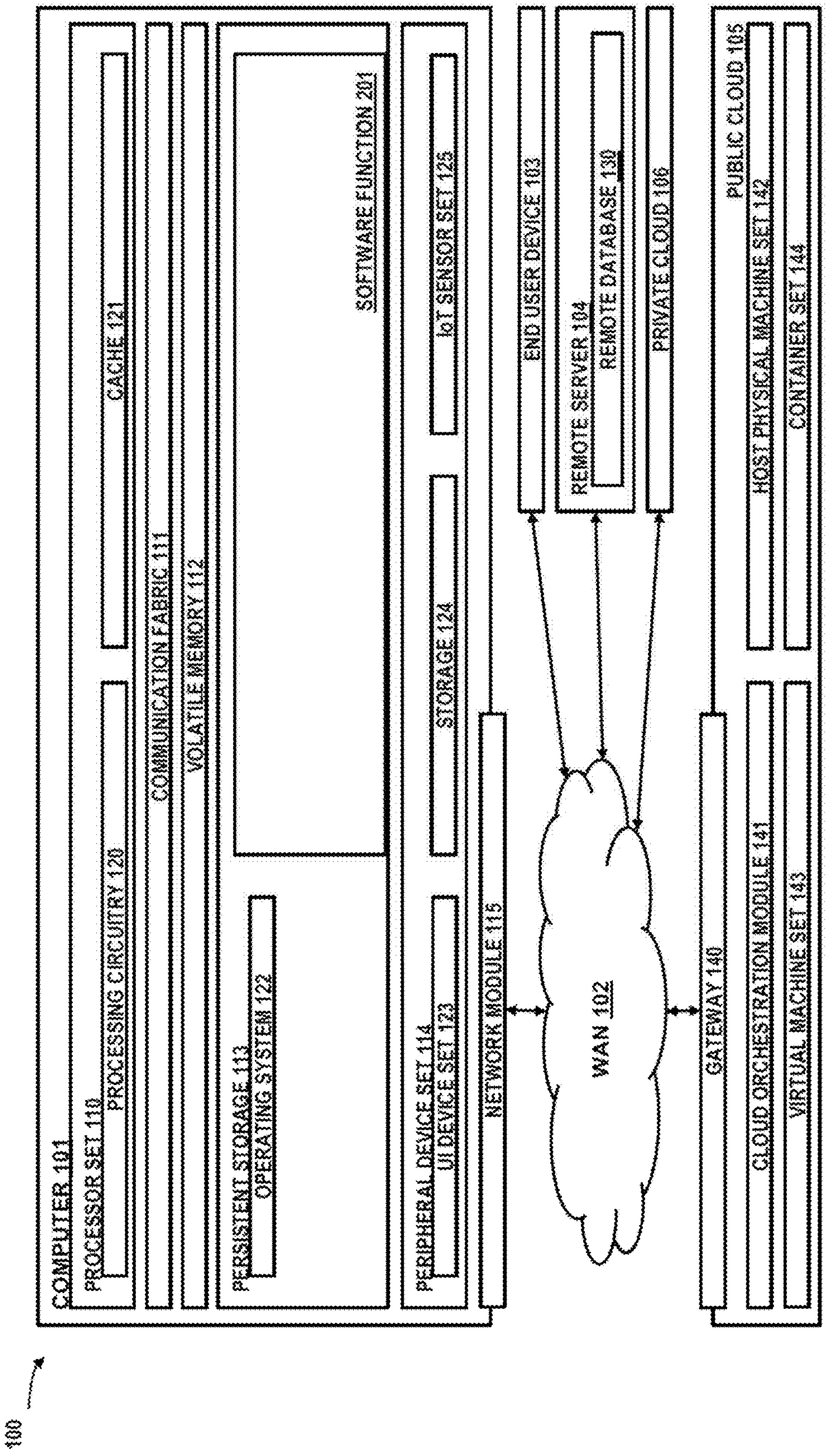
FIG. 1 depicts a computing environment, according to an embodiment of the present disclosure.

FIG. 1 depicts a computing environment 100. Computing environment 100 may be an example or demonstrative environment for the execution of at least some of the computer code involved in performing one or more embodiments of the present disclosure, such as software functions 201 for improved processing of vehicle paths. In addition to software functions 201, computing environment 100 may include, for example, computer 101, wide area network (WAN) 102, end user device (EUD) 103, remote server 104, public cloud 105, and private cloud 106. In this example, computer 101 includes processor set 110 (including processing circuitry 120 and cache 121), communication fabric 111, volatile memory 112, persistent storage 113 (including operating system 122 and software functions 201, as identified above), peripheral device set 114 (including user interface (UI) device set 123, storage 124, and Internet of Things (IoT) sensor set 125), and network module 115. Remote server 104 may include a remote database 130. Public cloud 105 may include gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that may be capable of running a program, such as software functions 201, accessing a network or querying a database, such as remote database 130. As may be well understood in the art of computer technology, and depending upon the technology, performance of a computer-implemented method may be distributed among multiple computers and/or between multiple locations. On the other hand, in this presentation of computing environment 100, detailed discussion may be focused on a single computer, specifically computer 101, to keep the presentation as simple as possible. Computer 101 may be located in a cloud, even though it may be not shown in a cloud in FIG. 1. On the other hand, computer 101 may be not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 may be memory that may be located in the processor chip package(s) and may be typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions, such as software functions 201, are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be included within software functions 201 in persistent storage 113.

Communication fabric 111 may be the signal conduction path that allows the various components of computer 101 to communicate with each other. Typically, this fabric may be made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may be any type of volatile memory now known or to be developed in the future. Examples include dynamic type random access memory (RAM) or static type RAM. Typically, volatile memory 112 may be characterized by random access, but this may be not required unless affirmatively indicated. In computer 101, the volatile memory 112 may be located in a single package and may be internal to computer 101, but, alternatively or additionally, the volatile memory may be distributed over multiple packages and/or located externally with respect to computer 101.

Persistent storage 113 may be any form of non-volatile storage for computers that may be now known or to be developed in the future. The non-volatility of this storage means that the stored data may be maintained regardless of whether power may be being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. For clarity, code associated with software functions 201 typically includes at least some of the computer code involved in performing one or more embodiments of the present disclosure, for example in the client functionality 1200, and/or the server functionality 1300.

Peripheral device set 114 may include the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 may be external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 may be required to have a large amount of storage (for example, where computer 101 locally stores and manages a large database) then this storage may be provided by peripheral storage devices designed for storing very large amounts of data, such as a storage area network (SAN) that may be shared by multiple, geographically distributed computers. IoT sensor set 125 may be made up of sensors that can be used in IoT applications. For example, one sensor may be a thermometer, another sensor may be a motion detector, etc.

Network module 115 may be the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 may be performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 may be any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 may be any computer system that may be used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 may be designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 may be any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 may be designed and programmed to provide a recommendation based on historical data, then this historical data may be provided to computer 101 from remote database 130 of remote server 104.

Public cloud 105 may be any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 may be performed by the computer hardware and/or software of cloud orchestration module 141. The computing resources provided by public cloud 105 may be typically implemented by virtual computing environments that run on various computers making up the computers of host physical machine set 142, which may be the universe of physical computers in and/or available to public cloud 105. The virtual computing environments (VCEs) typically take the form of virtual machines from virtual machine set 143 and/or containers from container set 144. It may be understood that these VCEs may be stored as images and may be transferred among and between the various physical machine hosts, either as images or after instantiation of the VCE. Cloud orchestration module 141 may manage the transfer and storage of images, deploys new instantiations of VCEs and manages active instantiations of VCE deployments. Gateway 140 may be the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container may be a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which may be known as containerization.

Private cloud 106 may be similar to public cloud 105, except that the computing resources are only available for use by a single enterprise. While private cloud 106 may be depicted as being in communication with WAN 102, in other embodiments a private cloud may be disconnected from the internet entirely and only accessible through a local/private network. A hybrid cloud may be a composition of multiple clouds of different types (for example, private, community or public cloud types), often respectively implemented by different vendors. Each of the multiple clouds remains a separate and discrete entity, but the larger hybrid cloud architecture may be bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments may be not intended to limit the scope of the application as claimed but may be merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it may be to be understood that the embodiments described are exemplary only and the scope of the application may be to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error may be present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

It may be to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

For clarity, the term "comprising", as used herein throughout the description and claims may be not to be construed as meaning "consisting only of".

A "destination ICAO" refers to the four-letter alphanumeric code designated by the International Civil Aviation Organization (ICAO) to identify specific airports around the world. These codes may be used in flight planning, air traffic control, and airline operations to clearly and uniquely identify airports. For example: John F. Kennedy International Airport (New York, USA): ICAO code may be KJFK; Dublin Airport (Ireland): ICAO may be EIDW; Heathrow Airport (London, UK): ICAO code may be EGLL.

The ICAO code may be different from the three-letter IATA code, which may be more commonly used by the general public and airlines for ticketing and baggage handling.

In an airfield, a control area may be defined as a specified region of airspace in which air traffic control (ATC) services may be provided to ensure the safety and efficiency of air traffic. The control area may be established to manage and separate aircraft operating within its boundaries, particularly in the vicinity of the airport and during critical phases of flight such as take-off, landing, and climbing or descending.

The control area has defined lower and upper altitude limits, and a defined horizontal boundary. Air traffic control services may be provided to all aircraft within this area, regardless of their flight rules (Visual Flight Rules (VFR) or Instrument Flight Rules (IFR)). Flight rules are the rules under which pilots operate aircrafts in different weather and visibility situations.

Aircraft typically transmit telemetry information to ground stations and other aircraft. Data also exists about the destination ICAO. Data sources include:

Flight Data (for example, altitude, airspeed, direction, orientation), aircraft system status; landing time and the scheduled times for a flight to a destination ICAO.

Navigation Data: Information from GPS, VHF Omnidirectional Range (VOR), Distance Measurement Equipment (DME), and other navigation aids. In particular, ADS-B (Automatic Dependent Surveillance-Broadcast), for real-time positioning and velocity data, regularly broadcasts the aircraft's position, velocity, and other information to air traffic control and other aircraft, using for example, VHF/UHF Radio, satellite communication; and ACARS (Aircraft Communications Addressing and Reporting System).

Position Reports: two different flight data streams of aircraft Position Reports with different data frequencies, may be stored for use by the image creation engine.

Airport Data: for example, runway configurations at destination ICAOs.

ASDO (Airport Surface Detection Equipment, Model X): surveillance system used by air traffic controllers to track ground movements of aircraft and vehicles on the airport surface. ASDE-X integrates data from various sources, including radar, multilateration, and Automatic Dependent Surveillance-Broadcast (ADS-B), to provide a comprehensive view of airport surface operations. This helps in enhancing safety and efficiency by preventing runway incursions and ensuring smooth ground operations.

EFD (Electronic Flight Data): digital system used to manage flight data electronically within air traffic control environments. EFD systems replace traditional paper flight progress strips with digital displays, allowing air traffic controllers to access and update flight information more efficiently. These systems help improve the accuracy, speed, and reliability of flight data management, enhancing overall air traffic control operations.

Visual/Camera Identification of Aircraft

Transmission frequency varies based on the type of data, the systems in use, and the phase of flight. ADS-B used for position, velocity, altitude, and identification information may be transmitted every second. ACARS sends short messages about flight operations to ground stations at critical phases of flight such as landing. Flight Data Monitoring Systems (FDM) continuously records, but transmits every few seconds to minutes. Data includes speed, altitude, attitude, control surface positions, and system statuses.

Different aircraft and avionics systems have varying capabilities and requirements for telemetry transmission. Newer aircraft with advanced avionics may have more frequent and detailed telemetry updates.

The availability of communication networks (e.g., VHF/UHF, satellite) can impact the frequency of telemetry transmission. Bandwidth limitations may necessitate balancing the frequency and volume of data transmitted.

Many airfields use cameras to monitor aircraft movement. Real-Time Monitoring (RTM) cameras provide live feeds to air traffic control (ATC) and airport operations centers to assist in managing aircraft movements and responding to incidents. Video footage may be recorded and stored for later analysis. Many types of cameras can be used, such as fixed, Pan-Tilt-Zoom (PTZ), Infrared and Thermal Cameras, and High-Definition (HD) Cameras.

One or more embodiments of the present disclosure first creates an historical image archive showing the flight paths of the aircraft landing at a destination ICAO along with meta data for what type of landing occurred and times of scheduled and actual landings. Secondly, an image classification model may be created for each destination ICAO based on the image archive. Real-time images for flights arriving at a destination ICAO may be created, and, using an image classification engine and the model for the destination ICAO, an indication can be made on whether a flight has followed a successful flight path, or, for example, has had to implement a go-around.

Figure 2:
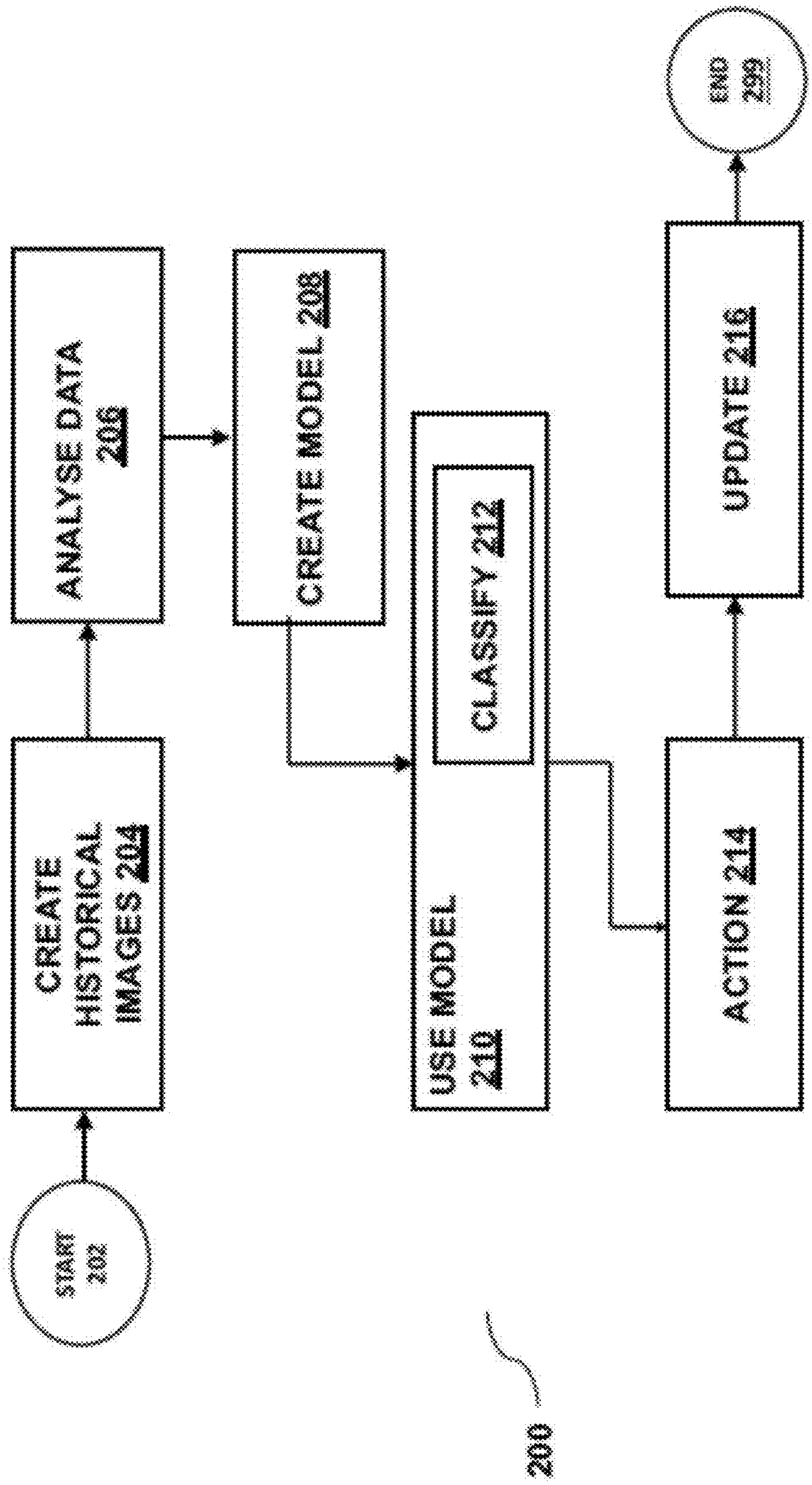
FIG. 2 depicts an exemplary schematic flow diagram, according to an embodiment of the present disclosure.
Figure 3:
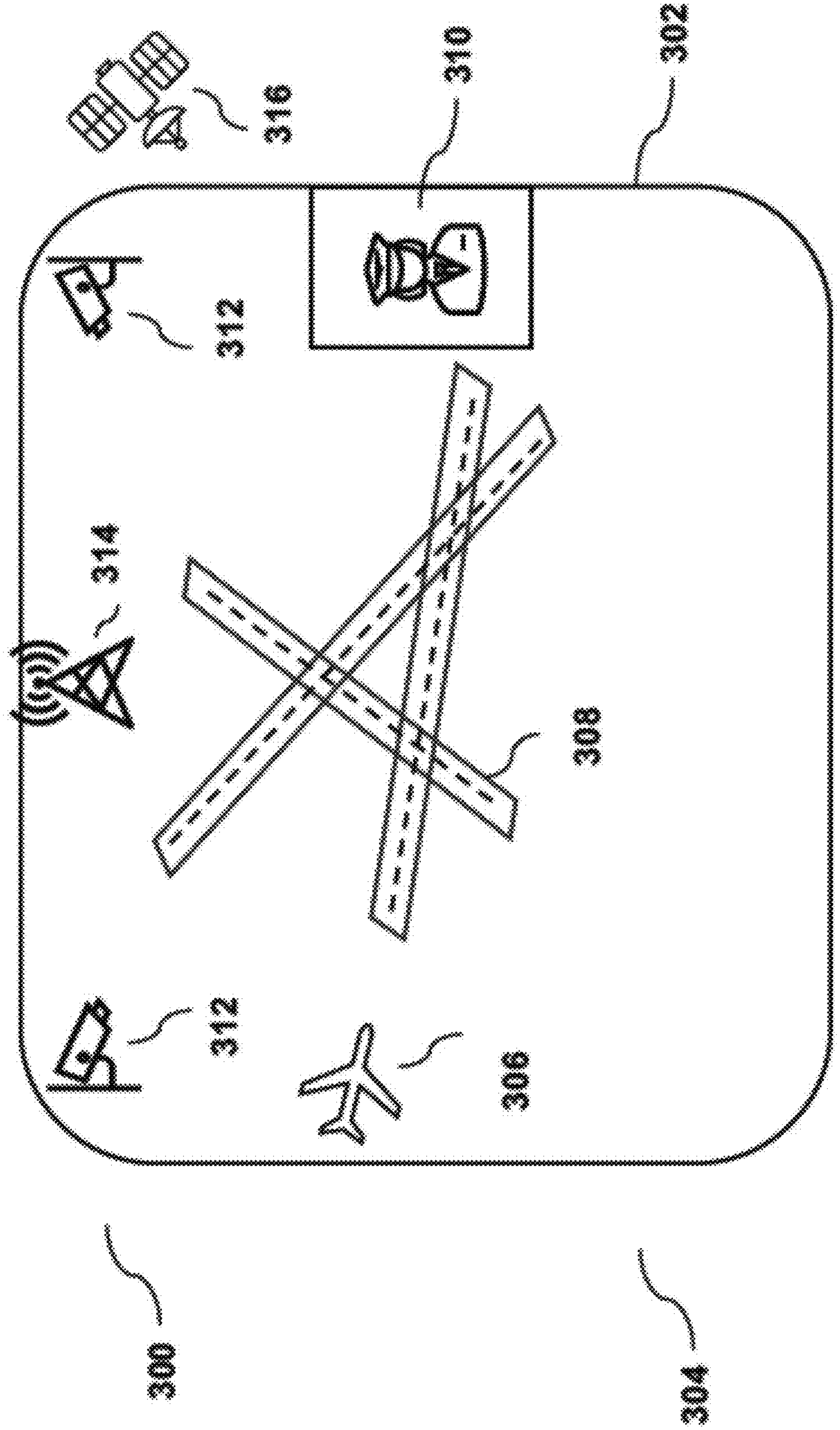
FIG. 3 depicts an aircraft system, according to an embodiment of the present disclosure.
Figure 4:
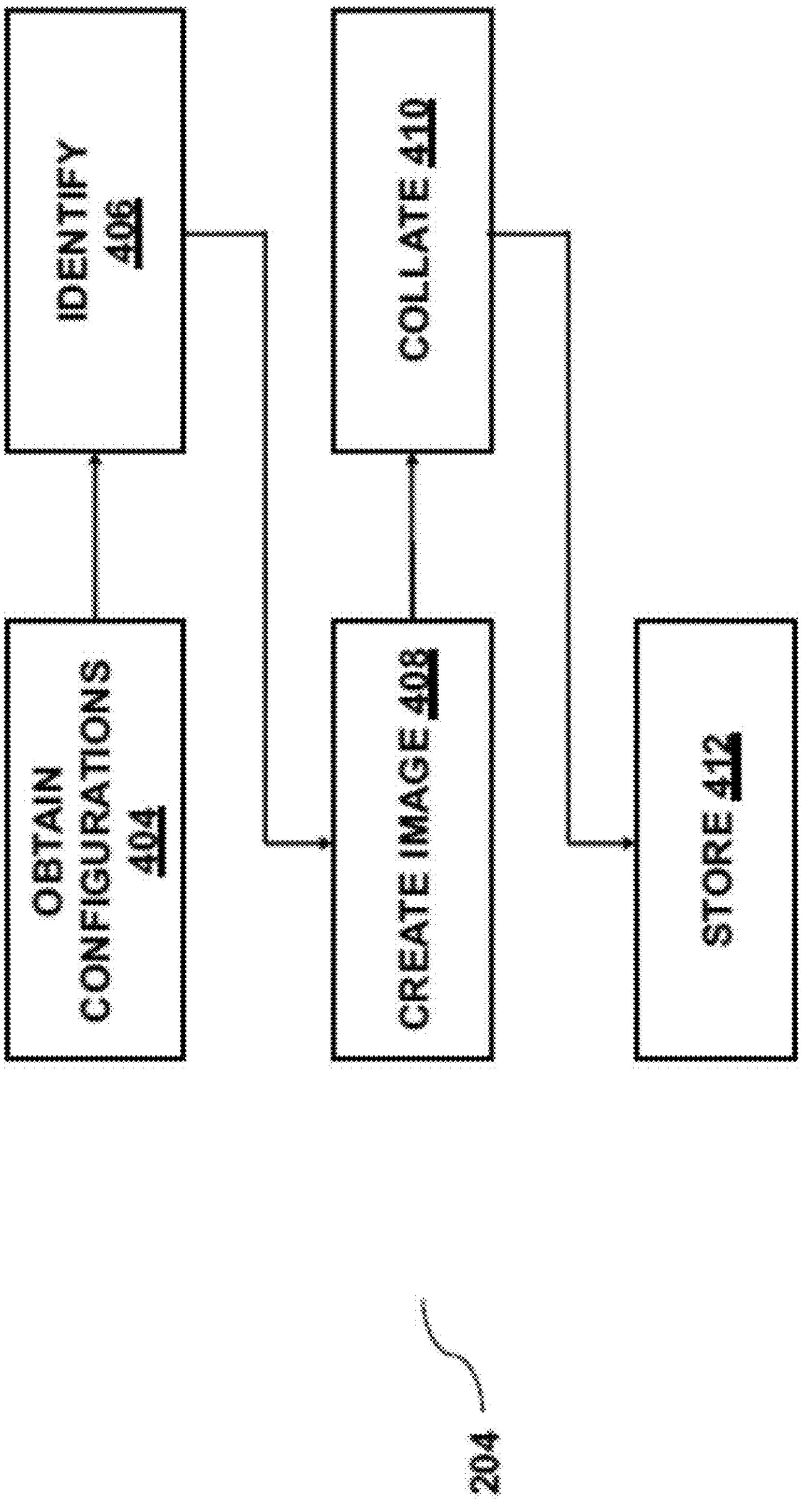
FIG. 4 depicts method, according to an embodiment of the present disclosure.
Figure 5:
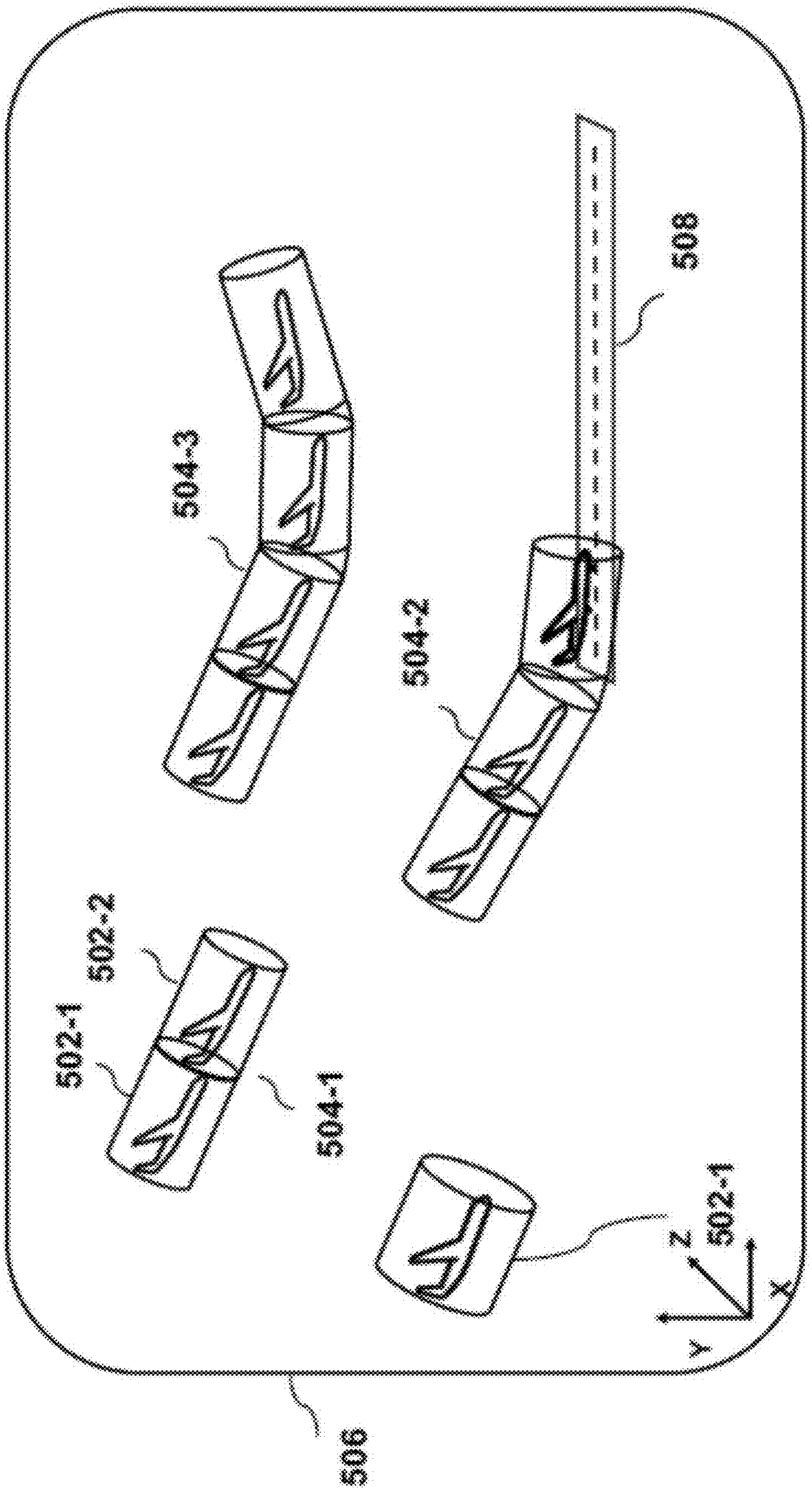
FIG. 5 depicts images of flight paths, according to an embodiment of the present disclosure.

FIG. 2, which should be read in conjunction with FIGS. 3-9 depicts a high-level method 200 depicting operation methodology identifying and actioning an aircraft path, such as path 504-1, path 504-2, and path 504-3, as depicted in FIG. 5, according to one or more embodiments of the present disclosure.

FIG. 3 depicts an aircraft system 300 comprising a control area 302 of a destination ICAO 304, according to one or more embodiments of the present disclosure. An aircraft 306 may be depicted landing on a runway configuration 308. Monitoring of the aircraft 306 may be performed by ATC 310. Images may be available through cameras 312, and communication between system elements made using transmitters/receivers 314, 316.

FIG. 4 depicts more detailed methodologies of block 204 for creating an archive of historical images, according to an embodiment of the present disclosure.

FIG. 5 depicts images 502 of flight paths 504 of aircraft landing on an overlay 508 of the runway configuration 308, according to one or more embodiments of the present disclosure.

Figure 6:
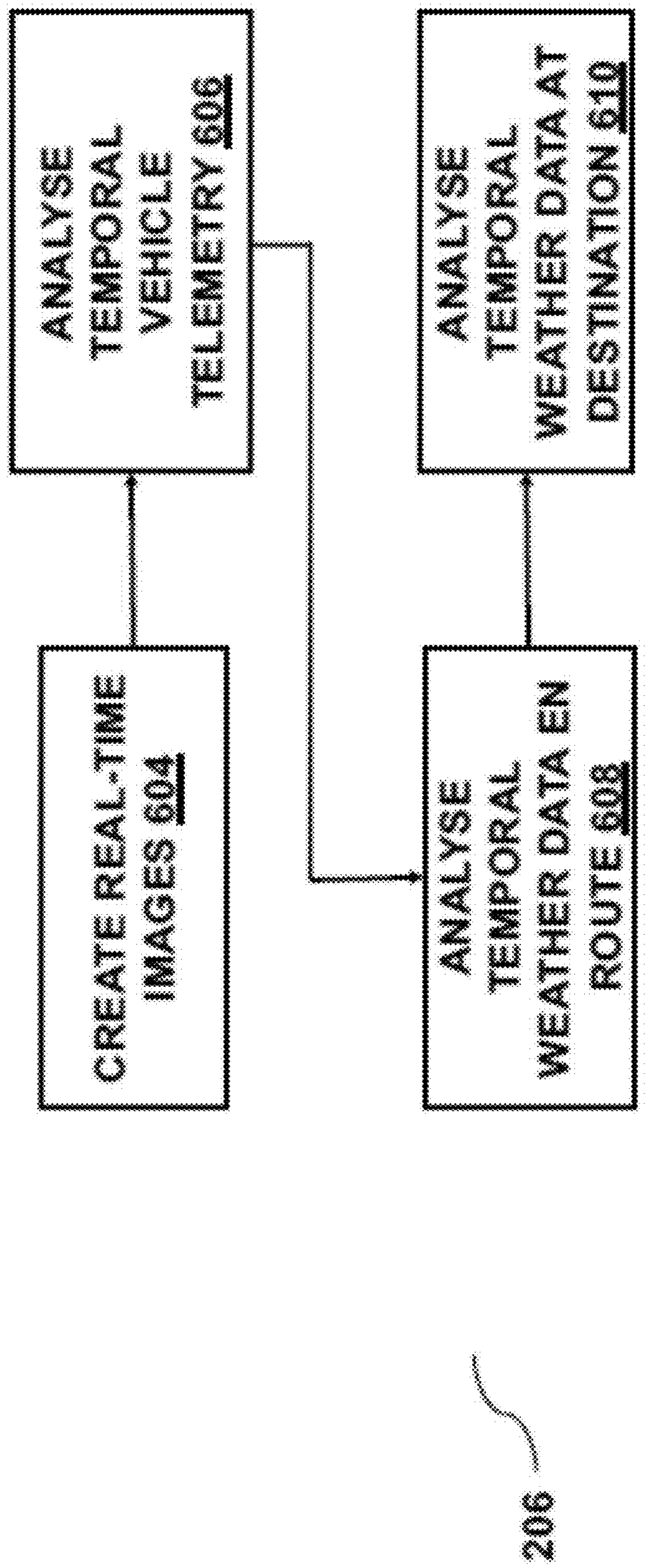
FIG. 6 depicts a method for analyzing data, according to an embodiment of the present disclosure.

FIG. 6 depicts more detailed methodologies of block 206 for analyzing data according to one or more embodiments of the present disclosure.

Figure 7:
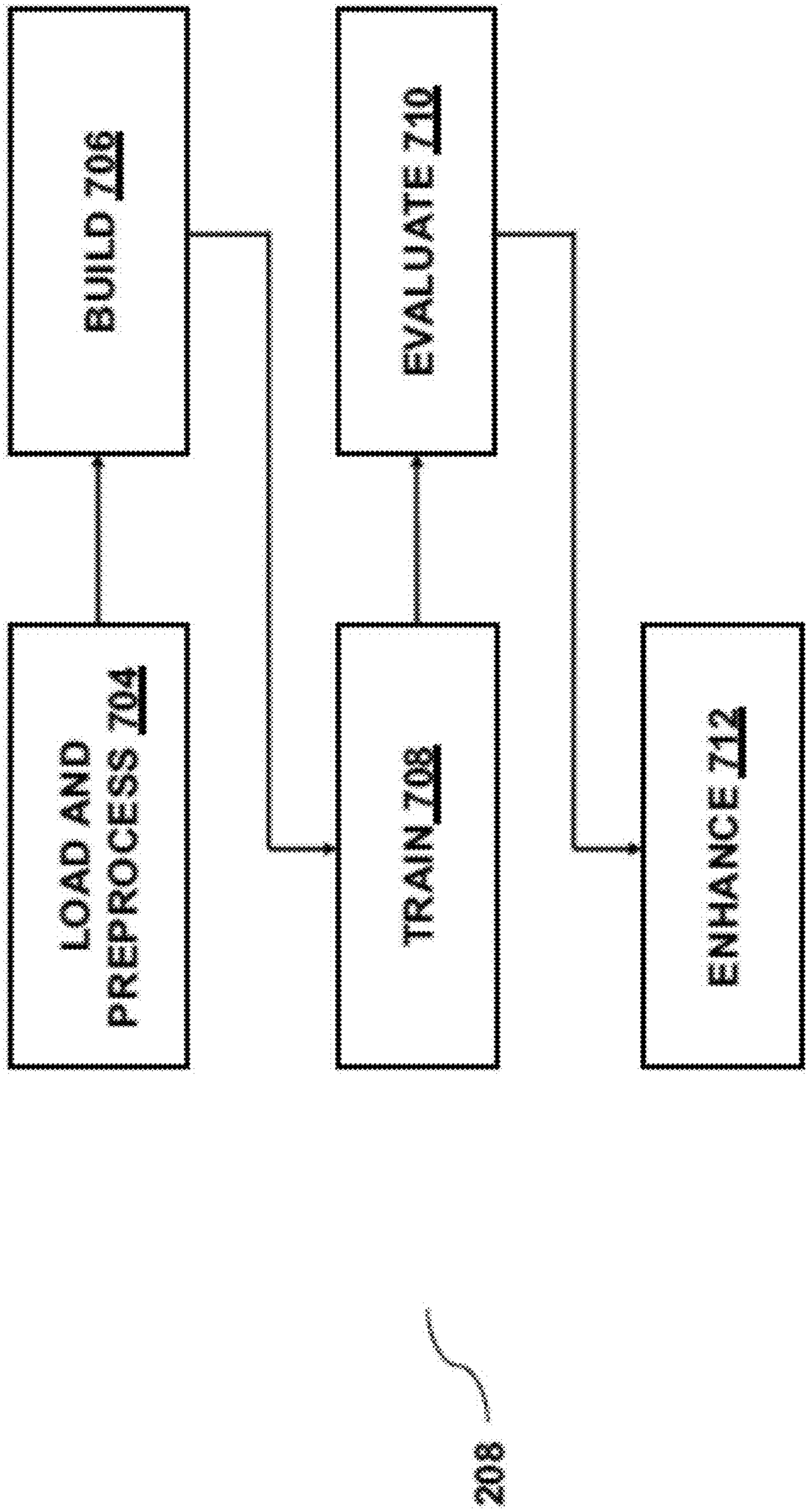
FIG. 7 depicts a method for creating a classification model, according to an embodiment of the present disclosure.
Figure 9:
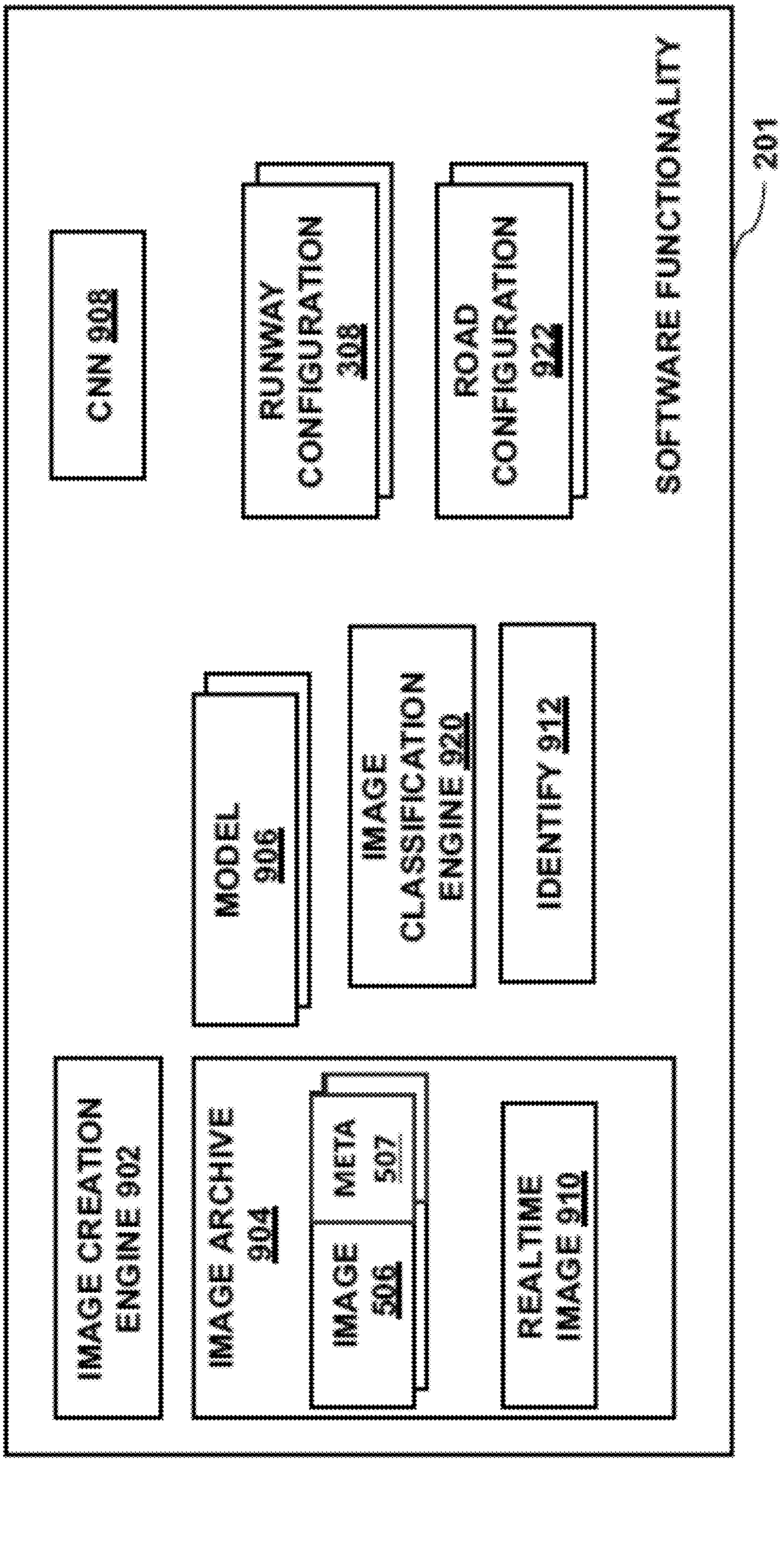
FIG. 9 depicts software components, according to an embodiment of the present disclosure.

FIG. 7 depicts more detailed methodologies of block 208 for creating a classification model 906, depicted in FIG. 9, for a destination ICAO 304, depicted in FIG. 3, according to one or more embodiments of the present disclosure.

Figure 8:
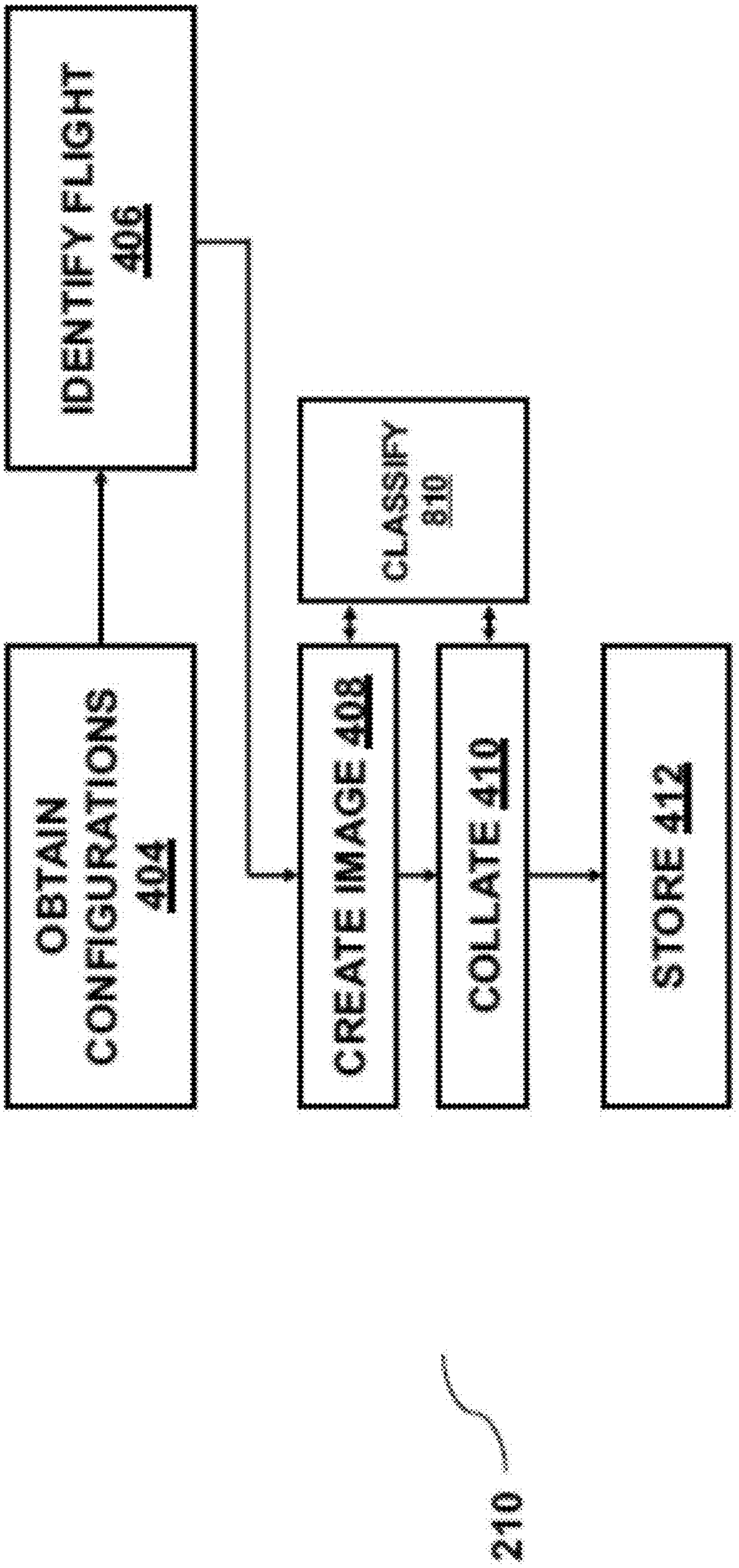
FIG. 8 depicts a method for creating real-time images, according to an embodiment of the present disclosure.

FIG. 8 depicts more detailed methodology of block 210 for creating a real-time images, according to one or more embodiments of the present disclosure.

FIG. 9 depicts exemplary software functions 201 associated with method 200, depicted in FIG. 2, according to one or more embodiments of the present disclosure.

In various embodiments of the present disclosure, as depicted in FIG. 2, method 200 beings at block 202. At block 204, an image creation engine 902, depicted in FIG. 9, creates a historical image archive 904 showing journey paths of a single vehicle at a location or destination for use with model training for each location or destination ICAO 304, depicted in FIG. 3. Alternatively, at block 204, the image creation engine 902 creates the historical image archive 904 showing journey paths of multiple vehicles operating under the same conditions (for example, under a level of turbulence) at the location or destination for use with model training for each destination ICAO 304.

At block 204, the image creation engine 902, depicted in FIG. 9, may create historical images back to X months and creates images and associated meta data for flight paths. For example, as depicted in FIG. 4, at block 404, the image creation engine 902 obtains the runway configuration 308 for the destination ICAO 304. At block 406, the image creation engine 902 identifies a flight that may be M miles from destination, or N minutes from scheduled arrival and obtains position reports for the associated time stamp. At block 408, the image creation engine 902 creates a timed image 502-1 at time Tx from the position reports, and timed image 502-2 at time TX+1. At block 410, images 502-1, 502-2 may be collated to trace a path 504-1 of the flight. A composite image 506 may also include an overlay of the runway configuration 308. Processing by the image creation engine 902 may continue until the aircraft has landed or taken an alternative path. At block 412, the composite image 506 may be stored in the image archive 904, depicted in FIG. 9. Images 502 of paths 504 may be labelled with metadata 507, depicted in FIG. 9, such as a classification of successful landing, or go-around, along with the scheduled time arrival and actual time of arrival. For example, a path 504-2 depicts a successful landing, whereas a path 504-3 depicts a go-around event. The skilled person would understand that many classifications could be defined, for example, a successful path, a go-around path, and a runway miss path. A runway miss path classification could assist ATC in the prevention of future air accidents The data collection of block 204 by the image creation engine 902 may gather a large and diverse set of labeled images for training of a classification model 906. These images represent the categories the model may be to recognize.

Method 200 may continue at block 206 where data associated with vehicle paths may be analyzed in preparation for creating respective image classification models 906, depicted in FIG. 9. For example, as depicted in FIG. 6, at block 604, a real-time image repository of vehicle journey paths may be created. At block 606, temporal vehicle telemetry data in route to a destination may be collated and analyzed. At block 608 temporal weather data along the journey route may be collated and analyzed. At block 610 temporal weather data at the destination may be collated and analyzed. The respective classification models 906 can be further enhanced with relevant information that would affect the flight path. For example, other factors, such as wind speed, other traffic in the vicinity etc. would likely to make a difference as to whether there was a go around. Not only would these factors affect the predicted models, but these factors may be also relevant in the determination of probability of whether a vehicle has followed a go-around path.

Method 200 may continue at block 208 in which respective classification model 906 may be created for each destination ICAO 304. An image classification model 906 may be a type of AI model, designed to categorize images 502, depicted in FIG. 5, into predefined classes or labels. The image classification model 906 may be used to analyze an image and assign it to one or more categories based on its content.

The image archive 904 contains images 506, depicted in FIG. 5, along with the associated meta data as it relates to an aircraft 306 landing at a destination ICAO 304, depicted in FIG. 3. Though the embodiments may be described with reference to a Convolutional Neural Network (CNN), which may be one of the most commonly used architecture for image classification, other architectures may be utilized. A CNN can automatically and adaptively learn spatial hierarchies of features from input images. Typical CNN architectures include layers such as convolutional layers, pooling layers, fully connected layers, and activation functions (e.g., ReLU). CNN models. However, the skilled person would understand that other architectures for an AI model can be used for image classification.

The classification model 906 may be created from the images 506 and the metadata 507 using the CNN engine 908, depicted in FIG. 9. The CNN engine 908 comprises code and/or hardware used as a starting point. In addition, CNN engine 908 comprises pre-trained models 906 from other destination ICAOs that may be suitable as a starting point to develop the model 906 of interest. Flight paths 504 may be three-dimensional 3D models. Creating a CNN for 3D images involves extending the principles of 2D CNNs to handle three-dimensional data.

As depicted in FIG. 7, at block 704, data from the image archive 904, depicted in FIG. 9, may be gathered and pre-processed. Preprocessing transforms the images 506, depicted in FIG. 5, and metadata 507 into a format suitable for training. At block 706, the pre-processed data may be built in preparation for training. At block 708, the model 906, depicted in FIG. 9, may be trained using the image 506 and metadata 507 in the image archive 904. Training may be performed by feeding the pre-processed images 506 and metadata 507 into the model 906 and using a labeled dataset to adjust the model 906 parameters. The model 906 may learn to map input images 506 to the correct output categories by minimizing a loss function through optimization techniques, like gradient descent.

At block 710, the performance of the model 906 may be assessed using metrics such as accuracy and precision, on a separate test set that was not used during training. At block 712, the model 906 can be enhanced. For example, augmentation techniques such as rotations, flips, and zooms can be applied to increase the diversity of the training set. Dropout and other regularization techniques can used to prevent overfitting. Experiments may also be made with different architectures, learning rates, and other hyperparameters to improve performance.

Method 200 may continue at block 210, depicted in FIG. 2, where an identify component 912, depicted in FIG. 9, identifies an aircraft 306, depicted in FIG. 3, of interest. A vehicle arrival detection model may be used to determine if the vehicle has arrived at its destination relative to vehicle telemetry data. Identification may be made using data received from the aircraft 306, or triggered externally, for example, from cameras 312, depicted in FIG. 3. Identification may also be made based on expected arrival time, for example, from X minutes before the time of scheduled of arrival to the time of landing. A real-time image 910, depicted in FIG. 9, may be created for the aircraft 306 landing at the destination ICAO 304, depicted in FIG. 3, using real-time images from the cameras 312, from X minutes before the time of scheduled of arrival to the time of landing the aircraft. Block 210 may follow similar methodologies as those of block 204.

At block 404, depicted in FIG. 4, the image creation engine 902 may obtain the runway configuration 308 for the destination ICAO 304, depicted in FIG. 3. At block 406, depicted in FIG. 4, the image creation engine 902 identifies the flight that may be M miles from destination, or X minutes from scheduled arrival and obtains position reports for the associated time stamp. At block 408, the image creation engine 902 creates a timed image 502-1, depicted in FIG. 5, at time Tx from the position reports, and timed image 502-2 at time TX+1. At block 410, images 502-1, 502-2 may be collated to trace a path 504-1 of the flight. A composite image 506, depicted in FIG. 5, also includes an overlay 508 of the runway configuration 308. Processing continues until the aircraft 306 has landed, or taken an alternative path.

In parallel with blocks 408 and 410, depicted in FIG. 4, at block 810, depicted in FIG. 8, an image classification engine 920, depicted in FIG. 9, may classify the path 504, depicted in FIG. 5. The image classification engine 920 may return a response indicating whether it found the image as indicating an unsuccessful arrival. A feedback loop may be used to verify the arrival detection. In an embodiment, the image classification engine 920 may be queried as to whether a successful landing has been made subsequent to collation block 410. The image classification engine 920 inputs the real-time image 910 and uses the latest model 906 for the destination ICAO 304 to categorize the path 504, for example, as successful. In block 212, depicted in FIG. 2, the trained model 906 classifies the real-time image 910 as being a new, unseen images. The model 906 outputs the probability or confidence scores for each category, and the category with the highest score may be usually selected as the predicted label. At block 412, the composite image 506 may be stored in the image archive 904. Images 502 of paths 504 may be labelled with metadata, such as a classification of successful landing, or go-around, along with the scheduled time arrival and actual time of arrival. A real-time image may be labeled with a tag to indicate that the image relates to a real-time event.

In an alternative embodiment, the image classification engine 920, depicted in FIG. 9, may be queried as to which category of path 504, depicted in FIG. 4, the aircraft 306, depicted in FIG. 3, may be following. The image classification engine 920 may inputs the real-time image 910 and uses the latest model 906 for the destination ICAO 304 to categorize the path 504, for example, as being on a successful path 504-2. In block 212, the trained model 906 may again classifies the real-time image 910 as being a new, unseen images. The model 906 outputs the probability or confidence scores for each category, and the category with the highest score may be usually selected as the predicted label corresponding to determining the closest match within the image archive 904. Referring to FIG. 5 again, the task to perform may be identifying whether path 504-1 may be a part of path 504-2, or a part of path 504-3. Parts of paths 504 may be also referred to as partial paths. As speed of classification may be advantageous, an AI ASIC and related hardware can be used. An example may be a Groq Language Processing Unit (LPU), which can be used for inference, and NVIDIA AI accelerators, which can be used for training and inference.

Method 200 may continue at block 214, depicted in FIG. 2, where an action may be taken based on the categorization of the path 504, depicted in FIG. 5. For example, in the case of a go-around, ATC 310 may be alerted to continue control of the flight.

Method 200 may continue at block 216, depicted in FIG. 2, with the model 906 may be enhanced by re-training with the details from the real-time image 910, depicted in FIG. 9. This may also allow an operator to manually verify the truth of the classification which can then be used to mark the real time image 910 as a user verified piece of data, and now as a historical image 506 and metadata 507. Model drift can be considered using monitoring techniques to indicate when retraining might be useful due to new runways being added for example. Method 200 may end at block 299.

In alternative examples, the invention may be applied to road vehicle paths 504-4, 505-5. For example, FIG. 2, which should be read in conjunction with FIGS. 4, 6-10 depicts a high-level exemplary method 200 depicting operation methodologies identifying and actioning a vehicle path 504-4, 505-5, according to embodiments of the present disclosure.

Figure 10:
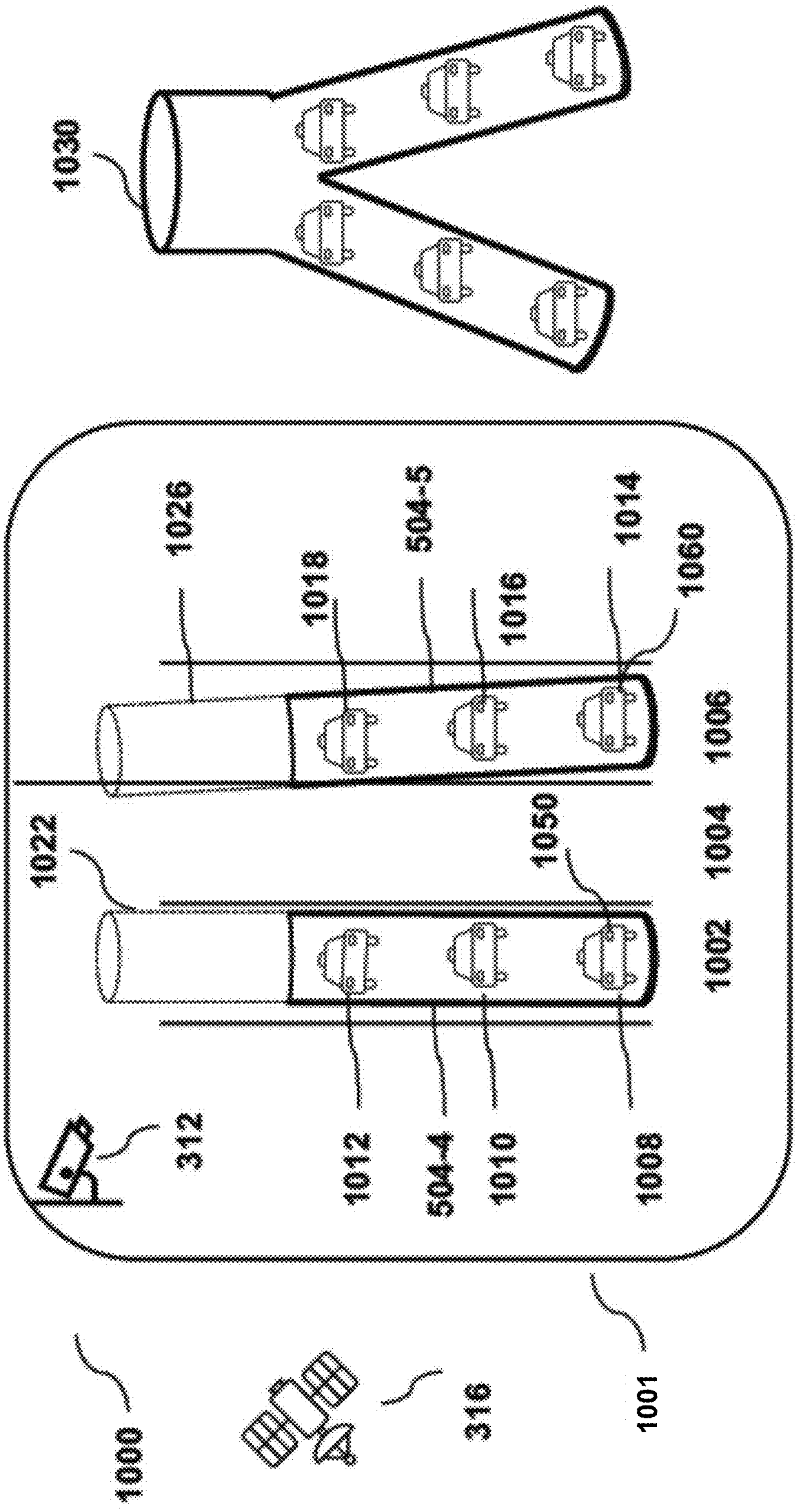
FIG. 10 depicts a vehicle system, according to an embodiment of the present disclosure.

FIG. 10 depicts a vehicle system 1000 comprising a control area 1001 of a road. Three lanes are depicted 1002, 1004, 1006. Monitoring of a first vehicle 1050, and a second vehicle 1060 may be performed by road traffic control, or on board navigation equipment with each vehicle 1050, 1060. Images may be available through cameras 312, depicted in FIG. 3, and vehicle sensors (not depicted), and communication between system elements made using transmitters/receivers 316.

In the left hand lane 1002 first vehicle 1050 may be depicted at time TX 1008, TX+1 1010, and TN. First vehicle 1050 follows a first path 504-4, depicted in FIG. 5, which may be projected as continuing into a first extended path 1022.

In the right hand lane 1006 second vehicle 1060 may be depicted at time TY 1014, TY+1 1016, and TM 1018. Second vehicle 1060 follows a second path 505-5, which may be projected as continuing into a second extended path 1026.

In this example, method 200, depicted in FIG. 2, may be followed to build images of paths 504-4, 505-5, depicted in FIG. 5, of road vehicles using components relevant to the situation, for example, a road configuration 922, depicted in FIG. 9, for that section of road. At block 212, depicted in FIG. 2, the image classification engine 920, depicted in FIG. 9, may categorize the first vehicle 1050 as following first path 504-4, which may be straight in the left hand lane 1002. Likewise, the image classification engine 920 may categorize the second vehicle as following second path 504-5, which may be veering into a center lane 1004. At block 212, no action needs to make for the first vehicle 1050 but braking or a steering correction may be required for the second vehicle 1060, if changing lanes is unintentional. Analysis of paths 504-4, 504-5 may also identify whether the paths 504-4, 504-5 match historic images of paths in the archive 904. In this way, vehicle paths 1022, 1026 can be identified.

In an alternative example, time period TX-TN may overlap with time period TY-TM. In this embodiment, relative positions of vehicle paths 504-4+1022, 504-5+1026 may be important. At block 212, depicted in FIG. 2, actions can be carried out by either or both of the vehicles 1050, 1060 to avoid an accident. One way of determining whether a collision may be likely to occur may be to create a composite path 1030 from individual paths 504-4+1022, 504-5+1026. The composite path 1030 can then be fed into the model 906 to determine whether the composite path 1030 represents a collision path by matching with historical images representing collision paths 1030. The skilled person would understand that many classifications could be defined, for example, a successful path, a lane veer path, and a collision path.

The skilled person would understand that the invention can be applied to many transport situations, including air transport, ground transport, and also sea transport.

In an alternative embodiment an alternative AI architecture may be used. The skilled person will understand that other architectures are also applicable for image recognition and processing. For example, but not limited to, other architectures as well as CNNs include, Generative Adversarial Networks (GANs), Transformer-Based Models, Autoencoders, Recurrent Neural Networks (RNNs), Large Language Models, and specialized architectures can be used. For example, YOLO may be used for real-time object detection.

What is claimed is:

1. A computer implemented method for managing vehicle paths, the method comprising:

receiving a historical dataset, the historical dataset comprising a first set of images of vehicle paths associated with a first location;

training an AI model with the first set of images to determine a first model and a set of classifications for the first set of images, wherein the AI model is selected from the group consisting of a Convolutional Neural Network (CNN), a Generative Adversarial Network (GAN), a Transformer-Based Model, an Autoencoder, a Recurrent Neural Network (RNN), a Large Language Model, and You Only Look Once (YOLO);

identifying a first vehicle;

creating a first new image of a first path taken by the first vehicle;

applying the first new image to the first model to determine a first classification for the first path, wherein the first classification is one of the set of classifications; and based on the first classification, performing an action associated with the first vehicle.

2. The method of claim 1, wherein receiving the historical dataset comprises gathering data, the data comprising at least one of vehicle position reports, vehicle images, and first location metadata.

3. The method of claim 1, wherein the first vehicle comprises one of air transport, ground transport, and sea transport.

4. The method of claim 1, wherein the first new image is added to the historical dataset to create a second set of images, and the AI model is retrained with the second set of images.

5. The method of claim 1, further comprising:

identifying a second vehicle;

creating a second new image of a second path taken by the second vehicle;

comparing the first new image with the second new image to determine a composite image;

applying the composite image to the first model to determine a composite classification of the set of classifications for the composite image; and based on the composite classification, performing an action related to at least one of the first vehicle and the second vehicle.

6. The method of claim 1, wherein the set of classifications comprises at least one of a successful path, a go-around path, a runway miss path, a lane veer path, and a collision path.

7. The method of claim 1, wherein creating the first new image of the first path taken by the first vehicle comprises creating timed images for the first vehicle over successive time slices, and collating the timed images to determine the first new image.

8. The method of claim 1, wherein applying the first new image to the first model comprises determining a closest match of the first new image from the historical dataset.

9. The method of claim 8, wherein determining the closest match comprises matching the first new image with partial images of the historical dataset.

10. A computer system comprising:

a processor set comprising processing circuitry;

one or more computer-readable storage media; and program instructions stored on the one or more computer-readable storage media to cause the processor set to perform operations comprising:

receiving a historical dataset, the historical dataset comprising a first set of images of vehicle paths associated with a first location;

training an AI model with the first set of images to determine a first model and a set of classifications for the first set of images, wherein the AI model is selected from the group consisting of a Convolutional Neural Network (CNN), a Generative Adversarial Network (GAN), a Transformer-Based Model, an Autoencoder, a Recurrent Neural Network (RNN), a Large Language Model, and You Only Look Once (YOLO);

identifying a first vehicle;

creating a first new image of a first path taken by the first vehicle;

applying the first new image to the first model to determine a first classification for the first path, wherein the first classification is one of the set of classifications; and based on the first classification, performing an action related to the first vehicle.

11. The system of claim 10, wherein receiving the historical dataset comprises creating the historical dataset by gathering data, the data comprising at least one of vehicle position reports, vehicle images, and first location metadata.

12. The system of claim 10, wherein the first vehicle comprises one of air transport, ground transport, and sea transport.

13. The system of claim 10, wherein the first new image is added to the historical dataset to create a second set of images, and the AI model is retrained with the second set of images.

14. The system of claim 10, wherein the program instructions stored on the one or more computer-readable storage media cause the processor set to perform operations comprising:

identifying a second vehicle;

creating a second new image of a second path taken by the second vehicle;

comparing the first new image with the second new image to determine a composite image;

applying the composite image to the first model to determine a composite classification of the set of classifications for the composite image; and based on the composite classification, performing an action related to at least one of the first vehicle and the second vehicle.

15. The system of claim 10, wherein the set of classifications comprises at least one of a successful path, a go-around path, a runway miss path, a lane veer path, and a collision path.

16. The system of claim 10, wherein creating the first new image of the first path taken by the first vehicle comprises creating timed images for the first vehicle over successive time slices, and collating the timed images to determine the first new image.

17. The system of claim 10, wherein applying the first new image to the first model to determine the first classification comprises determining a closest match of the first new image from the historical dataset.

18. A computer program product comprising:

one or more computer readable storage media; and program instructions stored on the one or more computer readable storage media to perform operations comprising:

receiving a historical dataset, the historical dataset comprising a first set of images of vehicle paths associated with a first location;

training an AI model with the first set of images to determine a first model and a set of classifications for each of the first set of images, wherein the AI model is selected from the group consisting of a Convolutional Neural Network (CNN), a Generative Adversarial Network (GAN), a Transformer-Based Model, an Autoencoder, a Recurrent Neural Network (RNN), a Large Language Model, and You Only Look Once (YOLO);

identifying a first vehicle;

creating a first new image of a first path taken by the first vehicle;

applying the first new image to the first model to determine a first classification for the first path, wherein the first classification is one of the set of classifications; and based on the first classification, performing an action related to the first vehicle.

* * * * *